(12) United States Patent
Jang et al.

(10) Patent No.: US 10,635,944 B2
(45) Date of Patent: Apr. 28, 2020

(54) SELF-SUPERVISED ROBOTIC OBJECT INTERACTION

(71) Applicant: Google LLC, Mountain View, CA (US)

(72) Inventors: Eric Victor Jang, Cupertino, CA (US); Sergey Vladimir Levine, Berkeley, CA (US); Coline Manon Devin, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/443,765

(22) Filed: Jun. 17, 2019

(65) Prior Publication Data

US 2019/0385022 A1 Dec. 19, 2019

Related U.S. Application Data

(60) Provisional application No. 62/685,885, filed on Jun. 15, 2018.

(51) Int. Cl.
*G06K 9/62* (2006.01)
*G06K 9/00* (2006.01)
*G06N 3/08* (2006.01)

(52) U.S. Cl.
CPC ....... *G06K 9/6262* (2013.01); *G06K 9/00664* (2013.01); *G06K 9/6256* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2015/0100530 A1* | 4/2015 | Mnih | G06N 3/0454 706/25 |
| 2017/0243135 A1* | 8/2017 | Ooba | G05B 19/4185 |
| 2018/0157916 A1* | 6/2018 | Doumbouya | G06K 9/627 |
| 2018/0157939 A1* | 6/2018 | Butt | G06K 9/66 |
| 2018/0222048 A1* | 8/2018 | Hasegawa | B25J 9/163 |
| 2018/0222057 A1* | 8/2018 | Mizobe | B25J 9/1697 |

(Continued)

OTHER PUBLICATIONS

Agrawal et al. "Learning to poke by poking: Experiential learning of intuitive physics" In Advances in Neural Information Processing Systems, pp. 5074-5082, 2016.

(Continued)

*Primary Examiner* — Feng Niu
(74) *Attorney, Agent, or Firm* — Fish & Richardson P.C.

(57) ABSTRACT

Methods, systems, and apparatus, including computer programs encoded on computer storage media, for training an object representation neural network. One of the methods includes obtaining training sets of images, each training set comprising: (i) a before image of a before scene of the environment, (ii) an after image of an after scene of the environment after the robot has removed a particular object, and (iii) an object image of the particular object, and training the object representation neural network on the batch of training data, comprising determining an update to the object representation parameters that encourages the vector embedding of the particular object in each training set to be closer to a difference between (i) the vector embedding of the after scene in the training set and (ii) the vector embedding of the before scene in the training set.

18 Claims, 5 Drawing Sheets

(56) References Cited

U.S. PATENT DOCUMENTS

| | | | | |
|---|---|---|---|---|
| 2018/0222058 | A1* | 8/2018 | Mizobe | B25J 9/163 |
| 2018/0225113 | A1* | 8/2018 | Hasegawa | B25J 9/163 |
| 2019/0009407 | A1* | 1/2019 | Iwanami | B65G 43/00 |
| 2019/0047143 | A1* | 2/2019 | Matsudaira | B25J 9/1676 |
| 2019/0130285 | A1* | 5/2019 | Snyder | G06Q 30/0613 |
| 2019/0188848 | A1* | 6/2019 | Madani | G16H 10/40 |
| 2019/0258982 | A1* | 8/2019 | Suzuki | B30B 15/26 |
| 2019/0275629 | A1* | 9/2019 | Ogawa | G05B 13/0265 |

OTHER PUBLICATIONS

Andrychowicz et al. "Hindsight experience replay" In I. Guyon, U. V. Luxburg, S. Bengio, H. Wallach, R. Fergus, S. Vishwanathan, and R. Garnett, editors, Advances in Neural Information Processing Systems 30, pp. 5048-5058. Curran Associates, Inc., 2017.

Bojarski et al. "End to end learning for self-driving cars" arXiv:1604.07316, Apr. 2016.

Cabi et al. "The intentional unintentional agent: Learning to solve many continuous control tasks simultaneously" arXiv:1707.03300, 2017.

Coumans et al. "Pybullet, a python module for physics simulation for games, robotics and machine learning" http://pybullet.org, 2016-2018.

Ebert et al. "Self-supervised visual planning with temporal skip connections" arXiv:1710.05268, Oct. 2017.

Fang et al. "Multi-task domain adaptation for deep learning of instance grasping from simulation" arXiv:1710.06422, Oct. 2017.

Florence et al. "Dense object nets: Learning dense visual object descriptors by and for robotic manipulation" arXiv:1806.08756, 2018.

Ghadirzadeh et al. "Deep predictive policy training using reinforcement learning" In Intelligent Robots and Systems (IROS), 2017 IEEE/RSJ International Conference on, pp. 2351-2358. IEEE, Mar. 2017.

He et al. "Deep residual learning for image recognition" In CVPR, pp. 770-778, 2016.

Jang et al. "End-to-end learning of semantic grasping" arXiv:1707.01932, 2017.

Jang et al. "Grasp2Vec: Learning Object Representations from Self-Supervised Grasping" arXiv:1811.06964v2, 2018.

Jayaraman et al. "Learning image representations tied to ego-motion" In Proceedings of the IEEE International Conference on Computer Vision, pp. 1413-1421, 2015.

Johnson et al. "Clevr: A diagnostic dataset for compositional language and elementary visual reasoning" In Computer Vision and Pattern Recognition (CVPR), 2017 IEEE Conference on, pp. 1988-1997.

Jonschkowski et al. ". Learning state representations with robotic priors" Autonomous Robots, 39(3):407-428, 2015.

Kalashnikov et al. "Qt-opt: Scalable deep reinforcement learning for visionbased robotic manipulation" arXiv:1806.10293, 2018.

Lenz et al. "Deep learning for detecting robotic grasps" The International Journal of Robotics Research, 34(4-5):705-724, 2015.

Levine et al. "Learning hand-eye coordination for robotic grasping with deep learning and large-scale data collection" In International Symposium on Experimental Robotics (ISER 2016), 2016.

Lin et al. "Microsoft coco: Common objects in context" In European conference on computer vision, pp. 740-755. Springer, 2014.

Mikolov et al. Distributed representations of words and phrases and their compositionality. In Advances in neural information processing systems, pp. 3111-3119, 2013.

Pas et al. "Grasp pose detection in point clouds" The International Journal of Robotics Research, p. 0278364917735594, Jun. 2017.

Pinto et al. "Supersizing self-supervision: Learning to grasp from 50k tries and 700 robot hours" In Robotics and Automation (ICRA), 2016 IEEE International Conference on, pp. 3406-3413. IEEE, 2016.

Pinto et al. "The curious robot: Learning visual representations via physical interactions" In European Conference on Computer Vision, pp. 3-18. Springer, 2016.

Radford et al. "Unsupervised representation learning with deep convolutional generative adversarial networks" arXiv:1511.06434, 2015.

Ross et al. "Learning monocular reactive uav control in cluttered natural environments" In Robotics and Automation (ICRA), 2013 IEEE International Conference on, pp. 1765-1772.

Russakovsky et al. "Imagenet large scale visual recognition challenge" International Journal of Computer Vision, 115(3):211-252, 2015.

Sohn Improved deep metric learning with multi-class n-pair loss objective. In D. D. Lee, M. Sugiyama, U. V. Luxburg, I. Guyon, and R. Garnett, editors, Advances in Neural Information Processing Systems 29, pp. 1857-1865. Curran Associates, Inc., 2016.

Wang et al. "Actions ~ transformations" In Proceedings of the IEEE conference on Computer Vision and Pattern Recognition, pp. 2658-2667, Jul. 2016.

Zeng et al. "Multi-view self-supervised deep learning for 6d pose estimation in the amazon picking challenge" In Robotics and Automation (ICRA), 2017 IEEE International Conference on, pp. 1386-1383.

Zeng et al, "Robotic Pick-and-Place of Novel Objects in Clutter with Multi-Affordance Grasping and Cross-Domain Image Matching", IEEE International Conference on Robotics and Automation, May 2018, 8 pages.

PCT International Search Report and Written Opinion in International Application No. PCT/US2019/03748, dated Oct. 14, 2019, 20 pages.

* cited by examiner

US 10,635,944 B2

SELF-SUPERVISED ROBOTIC OBJECT INTERACTION

CROSS-REFERENCE TO RELATED APPLICATION

This application claims priority to U.S. Provisional Application No. 62/685,885, filed on Jun. 15, 2018. The disclosure of the prior application is considered part of and is incorporated by reference in the disclosure of this application.

BACKGROUND

This specification relates to control policies for robots.

When being controlled by a robot control system, a robot interacts with an environment by performing actions that are selected by the robot control system in response to receiving state representations that characterize the current state of the environment.

Some robot control systems select the action to be performed by the robot in response to receiving a given state representation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as one or more computer programs on one or more computers in one or more locations that trains an object representation neural network to generate vector embeddings of objects encountered by the robot in an environment. A vector embedding is an ordered collection of numeric values, e.g., a vector of floating point values, that serves as a numeric representation of the object. A method of training an object representation neural network for a robot is also described.

The system can use the vector embeddings generated by the object representation neural network to control the robot to cause the robot to perform a task that includes performing a specified interaction with a particular object in the environment. For example, the specified interaction can involve any of locating the particular object, grasping the particular object, picking up the particular object, moving the particular object to a specific location in the environment, and so on. Because different episodes (instances) of the task can require interacting with different objects, the system uses the vector embeddings to allow the system to control the robot to cause the robot to interact with different desired objects in the environment based on an image of the desired object.

In particular, to control the robot, the system selects actions to be performed by the robot using an object interaction task neural network. While performing an episode of the task, the object interaction task neural network receives a network input that includes (i) a state representation of the environment, e.g., an image of the environment captured by a camera of the robot or a camera positioned elsewhere in the environment, and (ii) a vector embedding of a goal object in the environment, i.e., the object with which the robot should have the specified interaction to successfully complete the task. The object interaction task neural network processes the network input to generate a network output that can be used to select an action to be performed while the environment is in the state represented by the state representation.

To effectively control the robot, i.e., to allow the robot to consistently successfully perform the task for various different objects, the system trains the object interaction task neural network.

In some cases, the system trains the object interaction task neural network and the object representation neural network jointly. In other cases, the system trains the object representation neural network and then uses the trained object representation neural network in the training of the object interaction task neural network.

Particular embodiments of the subject matter described in this specification can be implemented so as to realize one or more of the following advantages.

An object representation neural network can be trained entirely on self-supervised data collected by a robot, allowing relationships between objects encountered by the robot in the environment to be learned without additional computational overhead. This allows the training to be performed using fewer computational resources while making use of easily collected unlabeled interaction data.

The object representations generated by the object representation neural network can be used to train an object interaction task neural network used to control a robot to perform tasks that involve interacting with objects in the environment. By generating reward values using the object representation neural network, an effective control policy for the robot can also be learned entirely on self-supervised data. In particular, by using vector embeddings generated by the object representation neural network during the training of the object interaction task neural network, the system can effectively learn from episodes where an object other than the goal objected was interacted with. This can reduce the number of task episodes required to train the neural network and can result in an improved trained neural network without requiring additional supervision for the training process. Training of the object interaction task neural network may therefore require fewer computational resources. An improved trained object interaction task neural network can facilitate improved robotic control.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a robot control system that controls a robot interacting with an environment by, at each of multiple time steps, processing data characterizing the current state of the environment at the time step (i.e., a "state representation") to select an action to be performed by the robot.

At each time step, the state of the environment at the time step depends on the state of the environment at the previous time step and the action performed by the robot at the previous time step.

In some implementations, the environment is a real-world environment and the robot is a mechanical robot interacting with the real-world environment.

In these implementations, the state representations may include, e.g., one or more of: images (for example of an environment, or a portion of the environment, or of objects within the environment), object position data, and sensor data to capture state representations as the robot interacts with the environment, for example sensor data from an image, distance, or position sensor or from an actuator.

For example in the case of a robot, the state representations may include data characterizing the current state of the robot, e.g., one or more of: joint position, joint velocity, joint force, torque or acceleration, e.g., gravity-compensated torque feedback, and global or relative pose of an item held by the robot.

The state representations may similarly include one or more of the position, linear or angular velocity, force, torque or acceleration, and global or relative pose of one or more parts of the robot. The state representations may be defined in 1, 2 or 3 dimensions, and may be absolute and/or relative state representations.

The state representations may also include, for example, sensed electronic signals such as motor current or a temperature signal; and/or image or video data for example from a camera or a LIDAR sensor, e.g., data from sensors of the robot or data from sensors that are located separately from the robot in the environment.

The actions are generally control inputs to control the robot, e.g., torques for the joints of the robot or higher-level control commands. In other words, the actions can include for example, position, velocity, or force/torque/acceleration data for one or more joints of a robot or other parts the robot. Action data may additionally or alternatively include electronic control data such as motor control data, or more generally data for controlling one or more electronic devices within the environment the control of which has an effect on the observed state of the environment.

Figure 1:
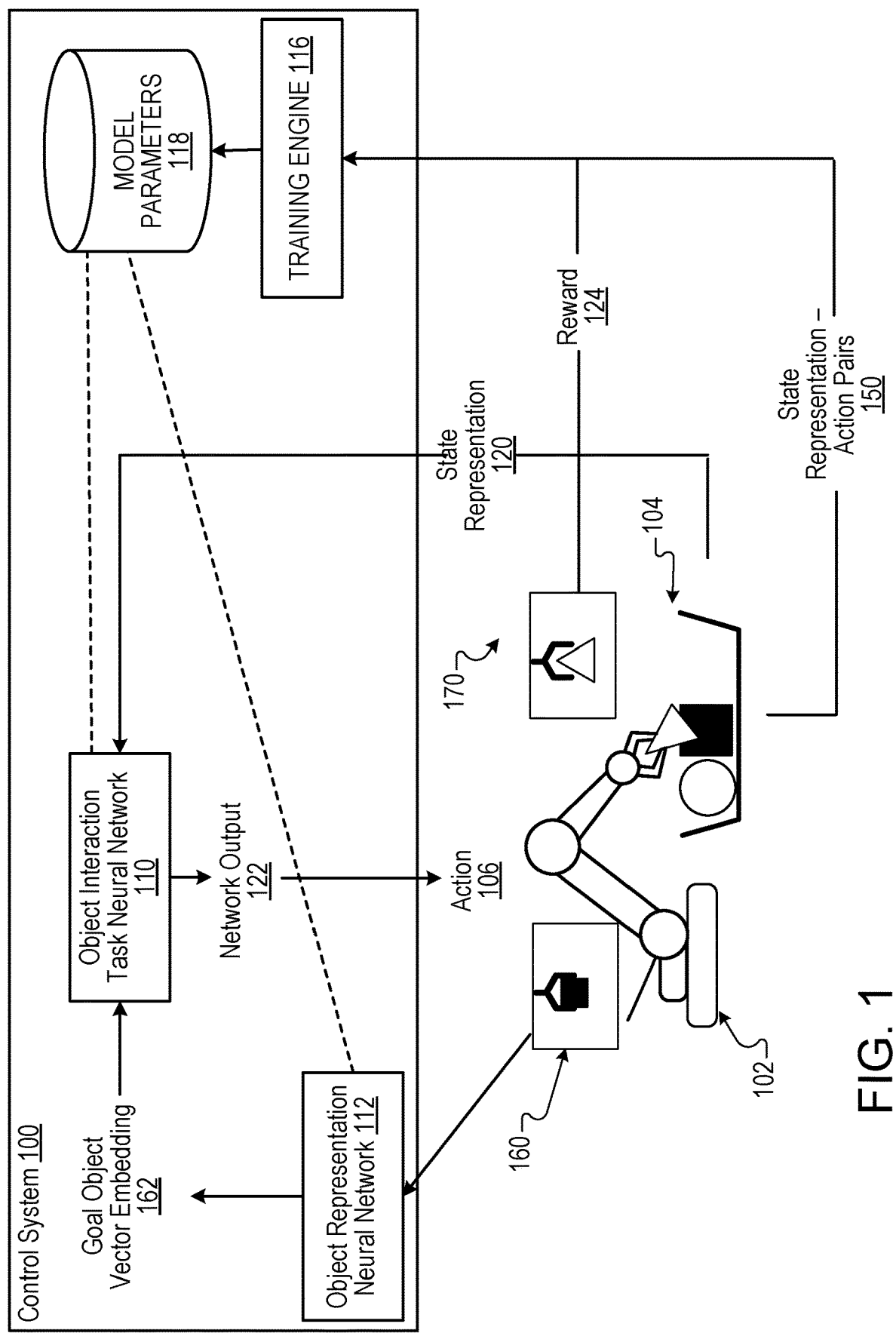
FIG. 1 shows an example robot control system.

FIG. 1 shows an example robot control system 100. The robot control system 100 is an example of a system implemented as computer programs on one or more computers in one or more locations in which the systems, components, and techniques described below are The system 100 controls a robot 102 interacting with an environment 104 by selecting actions 106 to be performed by the robot 102 and then causing the robot 102 to perform the selected actions 106. This repeated performance of actions by the robot generally causes the state of the environment to repeatedly transition into new states and causes the robot to perform a task that includes performing a specified interaction with a particular object in the environment. For example, the specified interaction can involve any of locating the particular object, grasping the particular object, picking up the particular object, moving the particular object to a specific location in the environment, and so on.

The system 100 includes an object interaction task neural network 110 and an object representation neural network 112. The system 100 also includes a training engine 116 and maintains a set of model parameters 118 that includes current values of the parameters of the object interaction task neural network 110 (referred to as "object interaction parameters") and the parameters of the object representation neural network 112 (referred to as "object representation parameters").

At each of multiple time steps, the object interaction task neural network 110 is configured to process an input that includes a current state representation 120 characterizing the current state of the environment 104 in accordance with the current values of the object interaction parameters to generate an network output 122 ("action selection policy"). As will be described in more detail below, the network input also includes an embedding 162 of a goal object 160 in the environment, i.e., the object with which the robot 102 should have the specified interaction in order to complete the task.

The system 100 uses the network output 122 to select the action 106 to be performed by the robot at the current time step. A few examples of using the network output 122 to select the action 106 to be performed by the robot 102 are described next.

In one example, the network output 122 may define a probability distribution over actions in a set of possible actions that can be performed by the robot. For example, the network output 122 may include a respective numerical probability value for each action in a set of possible actions that can be performed by the robot. As another example, the network output 122 may include parameters of a distribution over the set of possible actions, e.g., parameters of a multi-variate Normal distribution over the set of actions when the set of actions is represented as a continuous space. The system 100 can select the action to be performed by the robot, e.g., by sampling an action in accordance with the probability values for the actions, or by selecting the action with the highest probability value.

In another example, the network output 122 may directly define the action to be performed by the robot, e.g., by defining the values of torques that should be applied to the joints of a robotic robot.

In another example, the network output 122 may include a respective Q-value for each action in the set of possible actions that can be performed by the robot. The system 100 can process the Q-values (e.g., using a soft-max function) to generate a respective probability value for each possible action, which can be used to select the action to be performed by the robot (as described earlier). The system 100 could also select the action with the highest Q-value as the action to be performed by the robot.

The Q value for an action is an estimate of a "return" that would result from the robot performing the action in response to the current state representation 120 and thereafter selecting future actions performed by the robot 102 in accordance with current values of the policy neural network parameters.

A return refers to a cumulative measure of "rewards" 124 received by the robot, for example, a time-discounted sum of rewards. The robot can receive a respective reward 124 at each time step, where the reward 124 is specified by a scalar numerical value and characterizes, e.g., a progress of the robot towards completing the task.

In some cases, the system 100 can select the action to be performed by the robot in accordance with an exploration policy. For example, the exploration policy may be an $\epsilon$-greedy exploration policy, where the system 100 selects the action to be performed by the robot in accordance with the network output 122 with probability 1-$\epsilon$, and randomly selects the action with probability $\epsilon$. In this example, $\epsilon$ is a scalar value between 0 and 1. As another example, the system can add randomly sampled noise to the network output 122 to generate a noisy output and then select the action using the noisy output instead of the output 122.

The object representation neural network 112 is a neural network that generates vector embeddings of objects encountered by the robot in the environment. A vector embedding is an ordered collection of numeric values, e.g., a vector of floating point values, that serves as a numeric representation of the object. As will be described below, the training engine trains the object representation neural network 112 in an unsupervised manner to learn to generate vector embeddings that reflect relationships between objects encountered by the robot in the environment.

The system 100 uses the object representation neural network 112 to train the object interaction task neural network 110 so that the neural network 110 can effectively control the robot to perform tasks that involve interacting with different objects in the environment.

In particular, each network input received by the object interaction task neural network 110 includes a vector embedding 162 generated by the object representation neural network 112 of a goal object 160 in the environment. In other words, each network input includes both a state representation 120 and a goal object vector embedding 162 and the object interaction task network 110 generates network outputs conditioned on (conditioned on by, for example, taking as an input or otherwise using) embeddings of objects that the robot should interact with.

During the training of the object representation neural network 112, the system 100 performs episodes of the task by controlling the robot 102 using the object interaction task neural network 110 while the neural network 110 is conditioned on an embedding 162 generated by the object representation neural network 112. This goal object and, accordingly, the embedding will generally be different for different task episodes.

In other words, the system 100 has access to one or more cameras that capture images of the environment and of objects in the environment. For example, the one or more cameras may be sensors of the robot (e.g., the camera(s) that are used to capture the state representations) or stationary cameras external to the robot in the environment. The system uses these cameras to capture images of objects in the environment and provides the images as input to the object representation neural network 112 to generate the embeddings. The system 100 can capture an image of an object by controlling the robot to place the object in the field of view of the one or more cameras and then capturing an image while the objects are in the field of view.

For each task episode, the system 100 determines whether the robot 102 successfully completed the task for any object in the environment (even if different from the goal object 160) and, if so, determines the reward value 124 for the task episode using the object representation neural network 112.

In particular, when the robot 102 successfully completes the task for any object, the system 100 obtains an image of an outcome object 170 for which the task was completed. In the simplified example of FIG. 1, the task was to grasp the goal object 160 (a rectangle), but the robot 102 actually grasped an outcome object 170 (a triangle) that was different from the goal object 160.

The system then generates a reward value 124 for the episode from the image of the outcome object 160 using the object representation neural network 112. By generating the reward using the object representation neural network 112, the system 100 can generate a reward value 124 that accurately guides the training of the task neural network 110 even when the outcome object 170 is different from the goal object 160.

The training engine 116 then trains the neural network 110 on the reward value 124 and a set of state representation—action pairs 150 to update the current values of the object interaction parameters. Generating the reward value and training the object interaction task neural network 110 will be described in more detail below with reference to FIG. 4.

By generating reward values using the object representation neural network 112, the system can learn an effective control policy for the robot entirely on self-supervised data. In particular, as will become clear from the description below, the system does not need to explicitly identify whether the outcome object 170 and the goal object 160 are the same in order to effectively train the neural network.

Figure 2A:
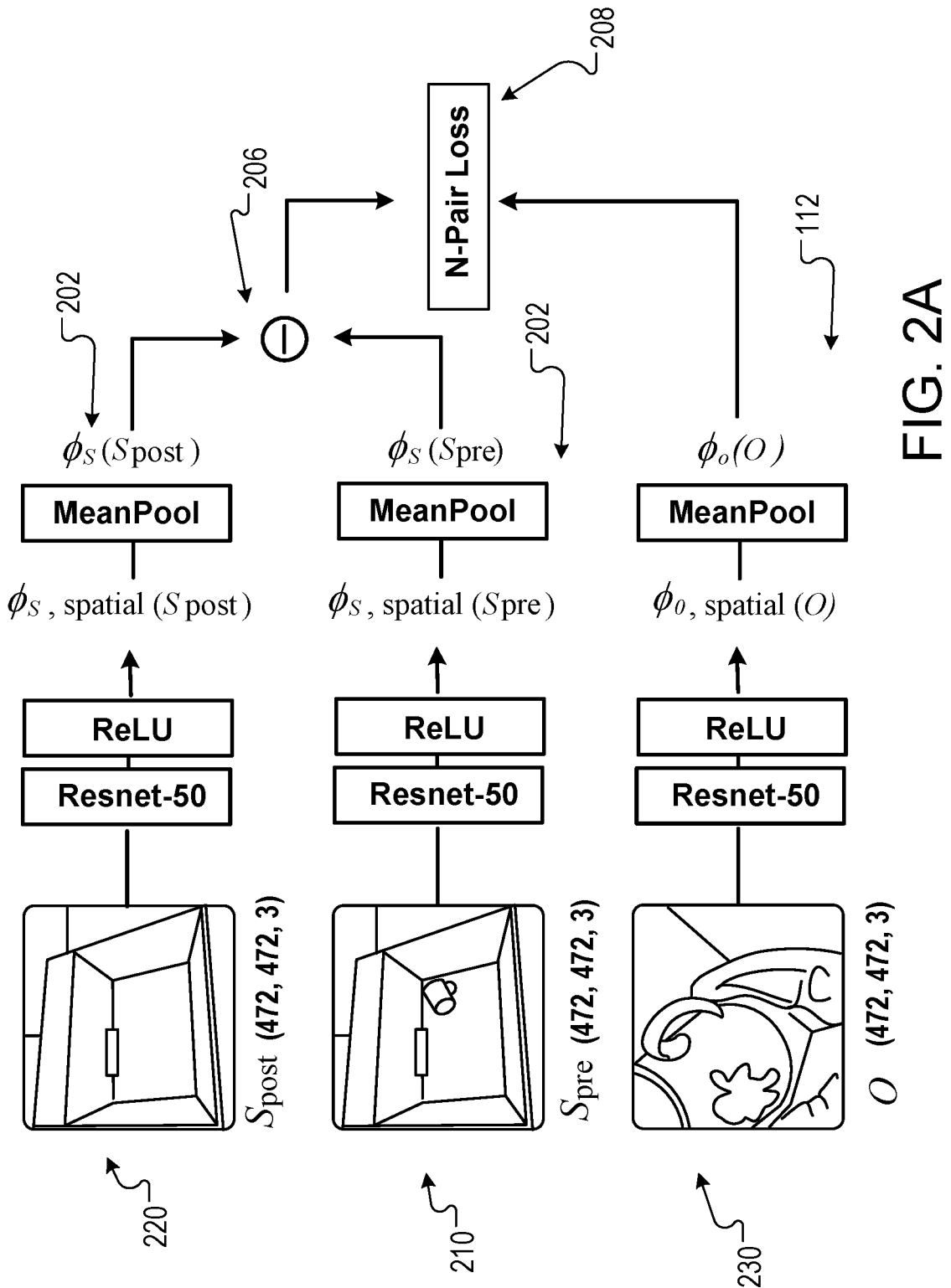
FIG. 2A shows an example architecture of the object representation neural network.

FIG. 2A shows an example architecture of the object representation neural network 112. FIG. 2A also shows an example architecture for a scene representation neural network 202 that is trained jointly with the object representation neural network 112.

Both the scene representation neural network 202 and the object representation neural network 112 are convolutional neural networks that receive an image (in this case a 472×472×3 image) and process the image to generate a vector embedding.

The scene representation neural network 202 is configured to receive an image of a scene and to process the image of the scene to generate a vector embedding of the scene. The parameters of the scene representation neural network 202 will be referred to in this specification as scene representation parameters.

Both the scene representation neural network 202 and the object representation neural network 112 are convolutional neural networks. In the example of FIG. 2, both neural networks include a set of convolutional neural network layers followed by a rectified linear unit ("ReLU") activation function. The convolutional layers are labelled as "resnet-50" in the figure because, in the example of FIG. 2, the layers are the convolutional layers of a neural network having the connectivity specified by the ResNet50 architecture described in K. He, X. Zhang, S. Ren, and J. Sun., "Deep residual learning for image recognition", in CVPR, pages 770-778, 2016. Each neural network then applies a global average pooling ("MeanPool") operation on the 3D output of the ReLU to generate a vector embedding.

To train the neural networks, the system processes a before image 210 ($s_{pre}$) of a before scene of the environment with one or more objects in a field of view of one or more cameras using the scene representation neural network 202 to generate a vector embedding of the before scene $\Phi_s(s_{pre})$. The system also processes an after image 220 ($s_{post}$) of an after scene of the environment after the robot has removed a particular object of the one or more objects from the field of view of the one or more cameras using the scene representation neural network 202 to generate a vector embedding of the after scene $\Phi_s(s_{post})$.

The system also processes an object image 230 (O) of the particular object that was removed from the field of view using the object representation neural network 112 to generate a vector embedding of the particular object $\Phi_o(O)$.

The system then determines a difference 206 between the vector embedding of the after scene $\Phi_s s_{post}$ and the vector embedding of the before scene $\Phi_s s_{pre}$ and trains the neural network by determining an update to the object representation parameters and the scene representation parameters that encourages the vector embedding of the particular object $\Phi_o(O)$ to be closer to the difference 206. "Encouraging" the vector embedding of the particular object $\Phi_o(O)$ to be "closer" to the difference 206 can result in a reduction in a distance (or difference) between the vector embedding of the particular object $\Phi_o(O)$ and the difference 206. In other words, determining an update to the object representation parameters includes determining an update that reduces a distance between the vector embedding of the particular object in each training set and a difference between (i) the vector embedding of the after scene in the training set and (ii) the vector embedding of the before scene in the training set.

In particular, the system trains the neural network by optimizing an objective function that depends on the difference 206 and the vector embedding of the particular object $\Phi_o(O)$ to reduce the distance between the vector embedding of the particular object (NO) and the difference 206. In some implementations, as will be described below, the objective function is an N-pairs loss 208.

Training the object representation neural network will be described in more detail below with reference to FIG. 3.

Figure 2B:
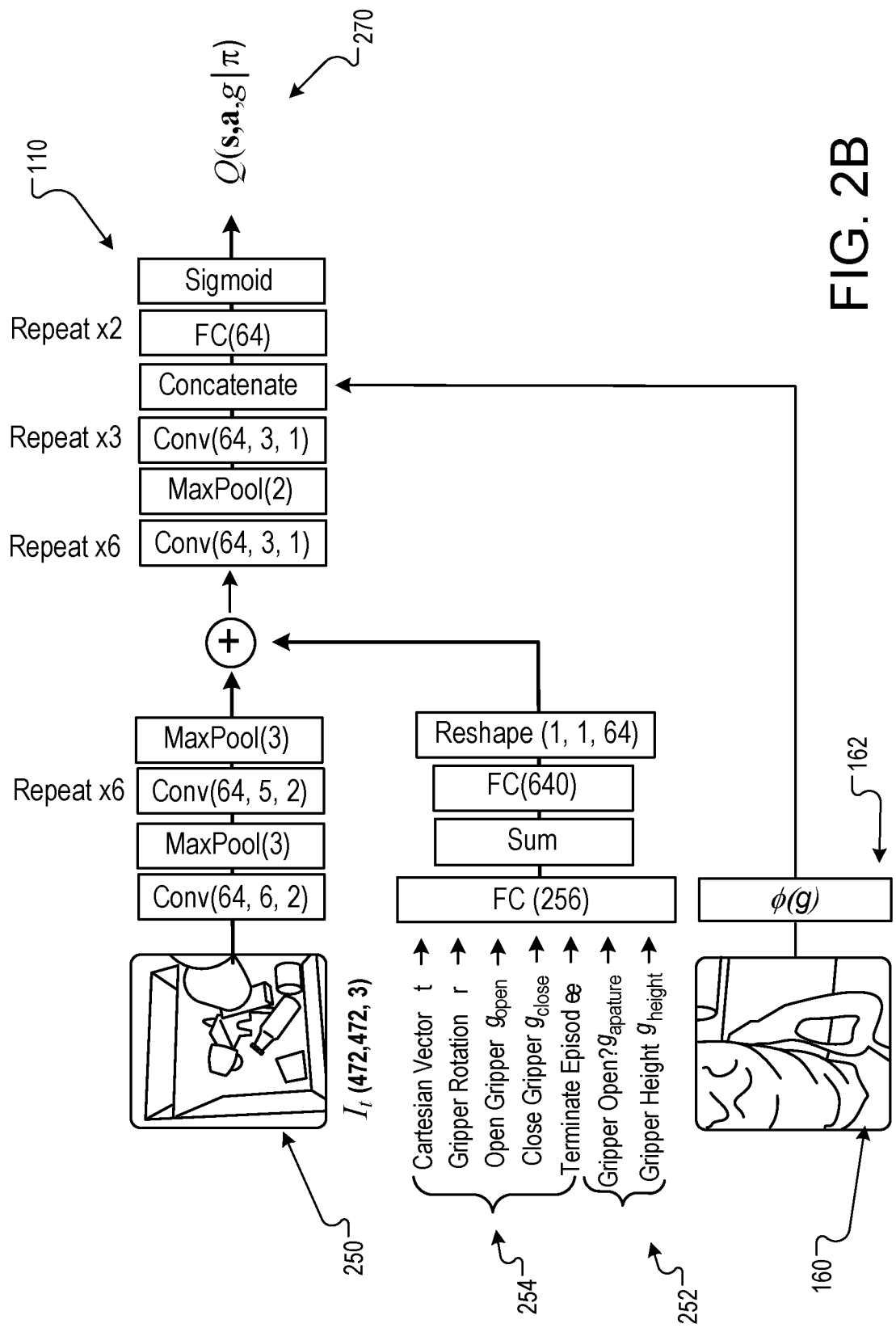
FIG. 2B shows an example architecture of the object interaction task neural network.

FIG. 2B shows an example architecture of the object interaction task neural network 110.

As shown in FIG. 2B, the object interaction task neural network 110 receives as input a state representation that includes an image of the environment 250 and data 252 characterizing the current state of the robot. In particular, in the example of FIG. 2B, the data 252 is data indicating whether the gripper of the robot is currently open and the current height of the gripper.

The input to the neural network 110 also includes action data 254 for an action. In the particular example of FIG. 2B, the action data includes a Cartesian vector, a gripper rotation value, an open gripper value, a close gripper value, and a terminate episode value. The object interaction task neural network 110 is also conditioned on the vector embedding 162 of the goal object 160 as generated by the object representation neural network 112.

Accordingly, the output of the object interaction task neural network 110 in the example of FIG. 2B is a Q value 270 that represents an estimate of the return that would be received by performing the action 254 when the environment is in the state characterized by the state representation and the goal object for the task episode is the goal object 160.

In the particular example of FIG. 2B, the action data 254 and state data 252 are processed through a fully-connected subnetwork that includes a fully connected layer with 256 nodes ("FC(256)"), followed by a sum layer ("sum"), a fully connected layer with 64 nodes ("FC(64)"), and a reshape layer ("Reshape(1,1,64)") that reshapes the output of the FC(64) layer into a 1×1×64 tensor.

The image 250 is processed through a convolutional subnetwork that includes multiple convolutional layers. In particular, the convolutional subnetwork includes convolutional layers (a "Conv(64,6,2)" layer and "Conv(64,5,1)" layers that are repeated six times) and max pooling layers ("maxpool").

The outputs of the convolutional subnetwork and the fully-connected subnetwork are added and then processed through additional convolutional layers ("Conv(64,3,1)" layers) before the goal embedding 162 is concatenated by a concatenation layer ("concatenate"). This concatenated output is then processed through fully-connected layers ("FC (64)") and, finally through an output layer ("sigmoid") to generate the Q value 270.

Figure 3:
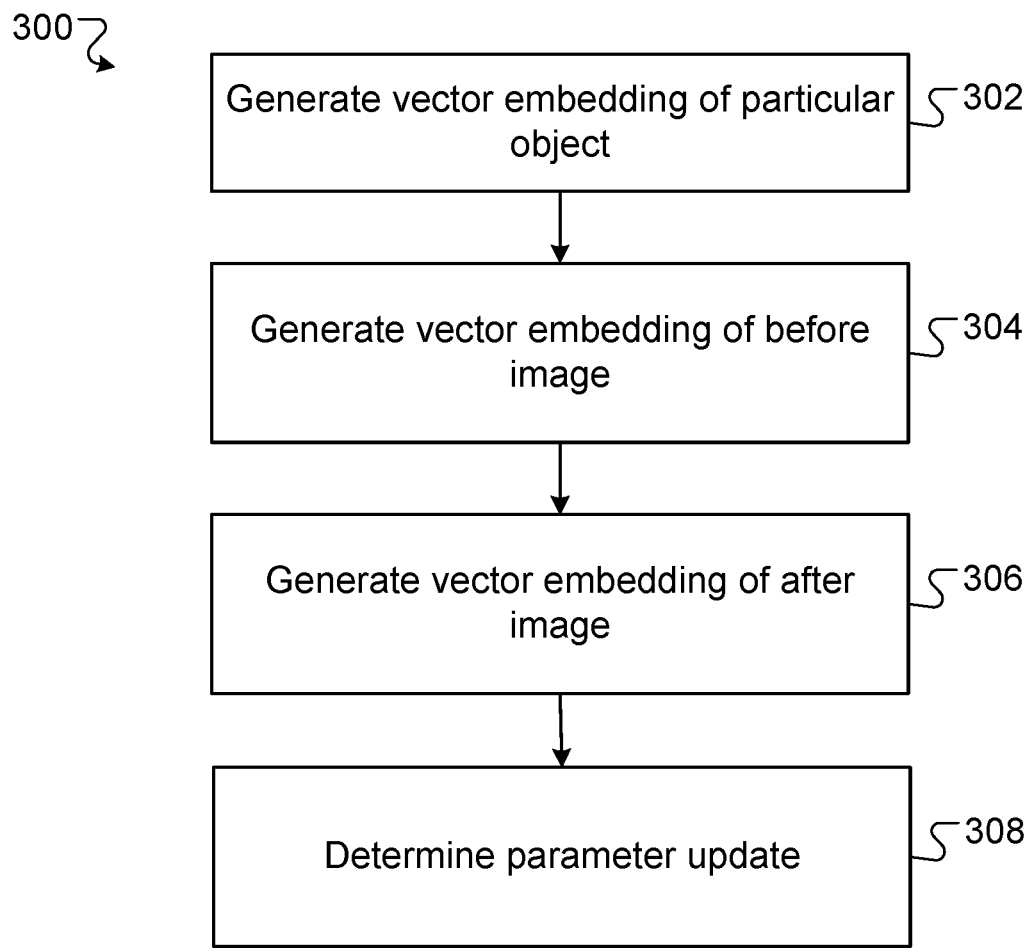
FIG. 3 is a flow diagram of an example process for training the object representation neural network.

FIG. 3 is a flow diagram of an example process 300 for training the object representation neural network. For convenience, the process 300 will be described as being performed by a system of one or more computers located in one or more locations. For example, a robot control system, e.g., the robot control system 100 of FIG. 1, appropriately programmed, can perform the process 300.

The system can perform the process 300 for each training set of images in a batch of training data that includes multiple training sets to generate a respective parameter value update for each training set. Each training set includes a set of images of an environment captured by one or more cameras as a robot interacts with the environment. More specifically, each training set of images includes a before image of the environment, an after image of the environment, and an image of a particular object from the environment.

Within a given training set, the before image shows one or more objects in the field of view of the camera that captured the before image, the after image of the environment shows the environment after the robot has removed a particular object from the field of view of the camera, and the object image is an image of the particular object that the robot removed from the field of view.

Generally, the system captures the training sets of images that are in the batch while causing the robot to interact with the environment.

In some implementations, the system trains the object representation neural network jointly with object interaction task neural network and obtains the training sets as a result of controlling the robot using the object representation neural network to perform task episodes as described above. That is, in these cases, the before image shows the environment before the robot begins a task episode, the after image of the environment shows the environment after the robot has successfully removed some object from the field of view of the camera while performing the task episode, and the object image is an image of the object that the robot removed from the field of view.

In other implementations, the system obtains the training sets by controlling the robot using an indiscriminate grasping policy, e.g., a policy that causes the robot to grasp and remove from the field of view whichever object is closest to the robot at any given point without regard for which object it is. In other words, an indiscriminate grasping policy is a grasping policy which is indiscriminate with regard to object. Thus, in these cases, the before image shows the environment before the robot begins to indiscriminately grasp objects, the after image of the environment shows the environment after the robot has grasped and removed some object from the field of view of the camera, and the object image is an image of the object that the robot removed from the field of view.

In yet other implementations, the system can first pre-train the object representation neural network using training data collected using the indiscriminate grasping policy and then begin to train the object representation and objection interaction task neural networks jointly.

The system processes the object image in the training set using the object representation neural network and in accordance with current values of the object representation parameters to generate a vector embedding of the particular object that was removed from the field of view (step 302).

The system processes the before image of the environment using the scene representation neural network in accordance with current values of the scene representation parameters to generate a vector embedding of the before scene (step 304).

The system processes the after image of the environment using the scene representation neural network and in accordance with the current values of the scene representation parameters to generate a vector embedding of the after scene (step 306).

The system determines an update to the object representation parameters and the scene representation parameters (step 308).

In particular, the system determines a gradient of an objective function with respect to the object representation parameters and the scene representation parameters and then determines the update from the gradient, i.e., by applying an update rule to the gradient. The update rule can be any appropriate update rule that maps gradients to parameter updates, e.g., the rmsProp update rule, the Adam optimizer update rule, a learned update rule, or a stochastic gradient descent learning rate. The system can then combine, e.g., average or sum, the updates for the training sets in the batch to determine a final update for the batch and then add the final update to the current values of the scene representation parameters and the object representation parameters.

Generally, the objective function has at least one term that measures the difference between the vector embedding of the particular object in each training set and a difference between (i) the vector embedding of the after scene in the training set and (ii) the vector embedding of the before scene in the training set. Thus, by determining the gradient, the system determines an update to the object representation parameters (and the scene representation parameters) that encourages the vector embedding of the particular object in each training set to be closer to the difference between (i) the vector embedding of the after scene in the training set and (ii) the vector embedding of the before scene in the training set (for example, an update that can reduce a distance between the vector embedding of the particular object in each training set and the difference between (i) the vector embedding of the after scene in the training set and (ii) the vector embedding of the before scene in the training set).

In some cases, the objective function also has one or more additional terms that measure the difference between a) the vector embeddings of other particular objects in other training sets in the batch and b) the difference between (i) the vector embedding of the after scene in the training set and (ii) the vector embedding of the before scene in the training set. In these cases, the update to the object representation parameters (and the scene representation parameters) encourages, for each training set, vector embeddings of other particular objects from other training sets to be farther from a difference between (i) the vector embedding of the after scene in the training set and (ii) the vector embedding of the before scene in the training set. "Encouraging" the vector embeddings of other particular objects from other training sets to be "farther" from a difference between (i) the vector embedding of the after scene in the training set and (ii) the vector embedding of the before scene in the training set, for example, can result in an increase in a distance (or difference) between each of the vector embeddings and the respective difference. In other words, determining an update to the object representation parameters includes determining an update that increases a distance (or a difference) between the vector embedding of the particular object in each training set and a difference between (i) the vector embedding of the after scene in the training set and (ii) the vector embedding of the before scene in the training set. Determining an update to the scene representation parameters includes determining an update that increases a distance between, for each training set, vector embeddings of other particular objects from other training sets and a difference between (i) the vector embedding of the after scene in the training set and (ii) the vector embedding of the before scene in the training set.

As a particular example, the objective function can include two NPairs loss terms. One NPairs loss term uses, for each training set, the difference (between the before and after scene embeddings) as an anchor embedding and the vector embedding of the particular object in the training set as the positive embedding. The other NPairs loss term uses, for each training set, the difference (between the before and after scene embeddings) as the positive embedding and the vector embedding of the particular object as the anchor embedding.

In other words, in this particular example, the objective function L (in this case a loss function that is being minimized) satisfies:

$$L = N\text{Pairs}(\Phi_s(s_{pre}) - \Phi_s(s_{post})), \Phi_o(O)) + N\text{Pairs}(\Phi_o(O), \Phi_s(s_{pre}) - \Phi_s(s_{post})),$$

where NPairs(a, p) satisfies:

$$NPairs(a, p) = \sum_{i<B} -\log\left(\frac{e^{a_i^T p_i}}{\sum_{j<B} e^{a_i \cdot p_j}}\right) + \lambda(\|a_i\|_2^2 + \|p_i\|_2^2),$$

where B is the batch size, i indexes into the anchor embeddings a, j indexes into the positive embeddings p, and $\lambda$ is a hyperparameter. The system can use two NPairs terms instead of one because, as can be seen from the equation above, the NPairs loss term is asymmetric.

This approach to training an object representation neural network can result in an improved trained neural network without requiring additional supervision for the training process. Training of the object representation neural network may therefore require fewer computational resources and effectively make use of easily acquired unlabeled object interaction data. An improved trained object representation neural network can facilitate improved robotic control, i.e., by being used in training the object interaction task neural network as described below.

Figure 4:
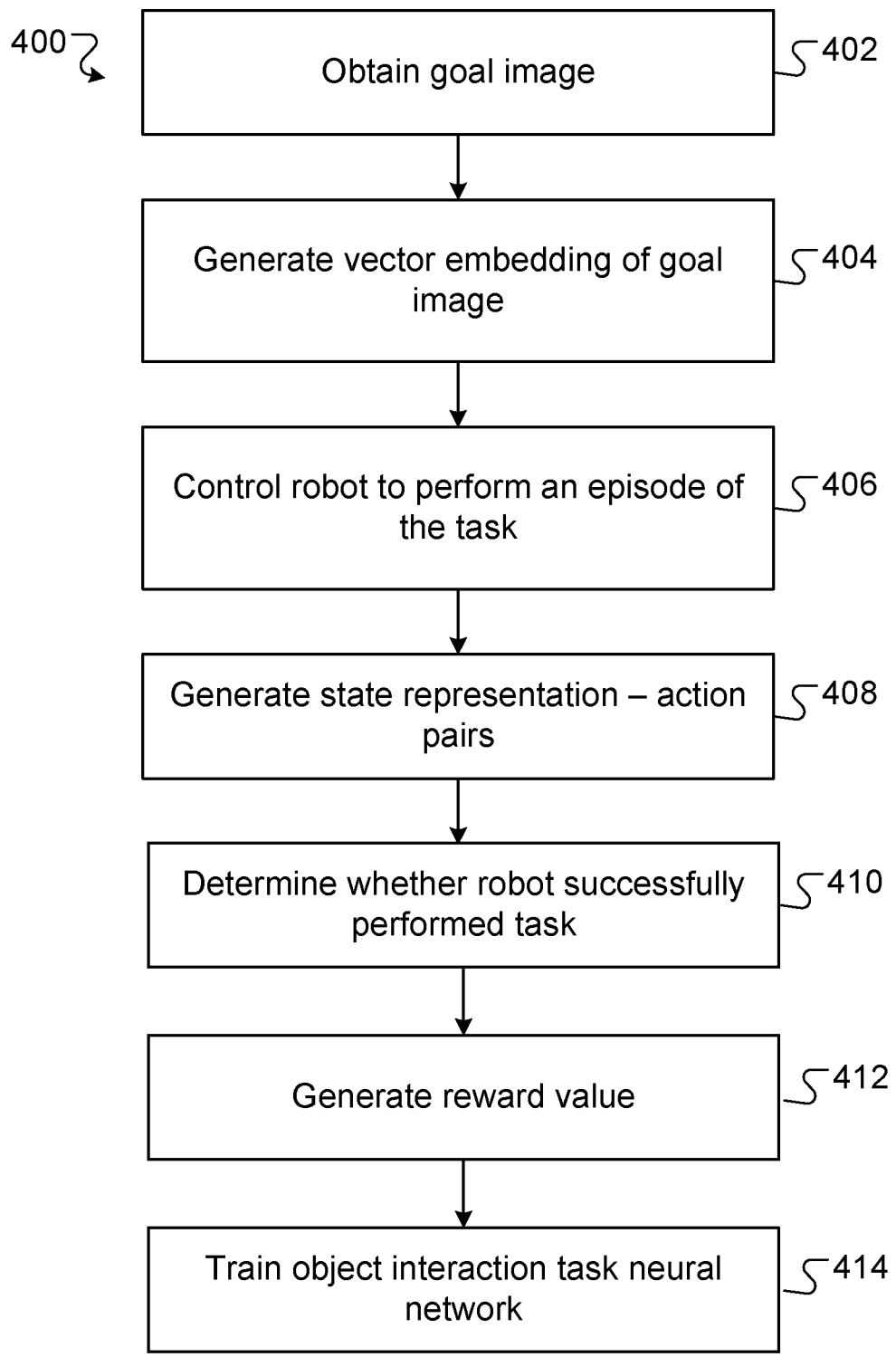
FIG. 4 is a flow diagram of an example process for training the object interaction task neural network.

FIG. 4 is a flow diagram of an example process 400 for training the object interaction task neural network. For convenience, the process 400 will be described as being performed by a system of one or more computers located in one or more locations. For example, a robot control system, e.g., the robot control system 100 of FIG. 1, appropriately programmed, can perform the process 400.

The system can repeatedly perform the process 400 for different task episodes in order to adjust the values of the object interaction parameters and train the object interaction task neural network to effectively control the robot to perform the specified task.

The system obtains a goal image of a goal object (step 402). The goal object is an object in the environment being interacted with by the robot. For example, the system can randomly select the goal image from a set of goal images of various objects in the environment.

The system processes the goal object image using the object representation neural network having a plurality of object representation parameters in accordance with current values of the object representation parameters to generate a vector embedding of the goal object (step 404).

The system controls the robot to perform an episode of the task by selecting actions to be performed by the robot using the object interaction task neural network while the object interaction task neural network is conditioned on the vector embedding of the goal object and in accordance with current values of the object interaction parameters (step 406). In other words, the system controls the robot using the object interaction task neural network while conditioned on the vector embedding of the goal object.

The system generates, from the actions performed during the episode, a sequence of state representation—action pairs (step 408). In particular, the state representation in each state representation—action pair characterizes the state of the environment when the action in the state representation—action pair was performed by the robot during the episode. For example, the sequence can include each action that was performed by the robot during the episode and the corresponding state representation characterizing the state the environment was in when the robot performed the action.

The system determines whether the robot successfully performed the task for any of the plurality of objects in the environment during the episode (step 410). That is, the system determines whether the robot successfully had the specified interaction with any of the objects in the environment during the episode. As a particular example, when the task is an object grasping task, the system can determine whether the gripper of the robot is unable to fully close at the conclusion of the episode and, if so, determine that the robot successfully grasped an object.

The system determines a reward value for the episode based on whether the robot successfully performed the task for any of the objects in the environment (step 412).

In particular, when the robot successfully performed the task for any of the objects in the environment, the system determines the reward value based on the robot successfully performing the task for one of the objects in the environment. The reward value may be a numerical value—for example, a reward value of one may indicate the task was successfully completed, e.g., where one is the highest reward value and zero is the lowest reward value indicating that the robot failed at performing the task. Other reward values may be used.

To determine the reward value, the system can obtain an image (referred to as a "successful object image") of the object for which the task was successfully performed, e.g., by causing the robot to place the object in a field of view of the camera and then capturing an image using the camera, and then process the successful object image using the object representation neural network in accordance with the current values of the object representation parameters to generate a vector embedding of the successful object.

The system determines a similarity measure, e.g., a cosine similarity, between the vector embedding of the successful object and the vector embedding of the goal object and determines the reward value based on the similarity measure between the vector embedding of the successful object and the vector embedding of the goal object, i.e., sets the similarity measure to be the reward value. Thus, the reward is higher the more similar the successful object is to the goal object and a positive reward value can be generated even if an object different from the goal object is the successful object.

When the robot did not successfully perform the task for any object, the system determines a reward value that indicates that the robot failed at performing the task, e.g., assigns a reward value of zero to the task episode.

The system trains the object interaction task network using the sequence of state representation—action pairs and the reward value (step 414).

The system can use any appropriate reinforcement learning technique that trains the neural network to maximizing the reward received during the task episode to update the current values of the parameters of the object interaction task neural network. Examples of reinforcement learning techniques that can be employed include a deep Q network training technique, a double Q-learning training technique, an actor-critic based technique, and a policy gradient based technique.

When using an on-policy technique, the system directly trains the object interaction task network using the sequence of state representation—action pairs. When using an off-policy technique, the system adds the sequence of state representation—action pairs and the reward value to a replay buffer and (potentially asynchronously from controlling the robot) periodically samples state representation—action—reward tuples from the replay buffer and uses the sampled tuples to train the neural network. Generally, the reward for each state representation—action pair other than the last state representation—action pair will be zero (or another value that indicates that the task was not successfully performed) while the reward for the last state representation—action pair in the sequence (the pair that includes the last action that resulted in the task being successfully performed) will be the reward value determined above.

In some implementations, for any task episodes where the task was successfully performed, the system can augment the training data in order to improve the effectiveness of the training.

For example, the system can also train the neural network on a sequence of state representation—action pairs and a reward value that is set to a value that indicates that the task was successfully completed, e.g., a value of one, and, during this training, assign the object for which the task was successfully performed as the goal object for the training of the neural network. In other words, during training the neural network on the sequence the system can condition the neural network on an embedding of the object for which the task was successfully performed (even though the sequence of state representation—action pairs was generated when the neural network was conditioned on the embedding of the goal object). Like above, during this training, the system sets the reward for each state representation—action pair other than the last state representation—action pair to zero (or another value that indicates that the task was not successfully performed) while the reward for the last state representation—action pair in the sequence (the pair that includes the last action that resulted in the task being successfully performed) will be one (or another value that indicates that the task was successfully performed).

As another example, the system selects an alternate object in the environment that is different from the goal object. For example, the system can select the alternate object randomly from the of possible goal objects.

The system can then determine a similarity measure between the vector embedding of the successful object and a vector embedding of the alternate object (as described above) and determines a reward value based on the similarity measure between the vector embedding of the successful object and the vector embedding of the alternate object and train the object interaction task neural network (i) using the sequence of state representation—action pairs and the reward value and (ii) with the alternate object assigned as the goal object for the training of the object interaction task neural network.

In other words, for at least the last state representation—action pair in the sequence, i.e., the pair for which the task was completed, the system can condition the neural network on an embedding of the alternate object and associate the pair with the reward value that is based on the similarity measure between the vector embedding of the successful object and the vector embedding of the alternate object.

As yet another example, the system can instead train the object interaction task neural network (i) using the sequence of state representation—action pairs and a reward value that indicates that the robot failed at performing the task and (ii) with the alternate object assigned as the goal object for the training of the object interaction task neural network.

By employing one or more of these augmentation techniques, the system can augment the training data without needing to perform additional task episodes. This can improve the data efficiency of the training process and reduce the amount of wear and tear on the robot generated as a result of the training process.

Although the subject technologies have been described primarily within the context of a physical real-world environment, it will be appreciated that the techniques described herein may also be utilized with non-real-world environments. For instance, in some implementations the environment may be a simulated environment and the agent may be a simulated robot interacting with the simulated environment. This may be advantageous, e.g., when the neural networks are trained in simulation and then later deployed to control a real-world robot interacting with a real-world environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

This approach to training an object interaction task neural network can reduce the number of task episodes required to train the neural network and can result in an improved trained neural network without requiring additional supervision for the training process. Training of the object interaction task neural network may therefore require fewer computational resources. An improved trained object interaction task neural network can facilitate improved robotic control.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs. The one or more computer programs can comprise one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training an object interaction task neural network that (i) has a plurality of object interaction parameters and (ii) is used to select actions to be performed by a robot to cause the robot to perform a task that includes performing a specified interaction with a particular object of interest in an environment conditioned on an image of the particular object of interest, the method comprising:

obtaining a goal object image of a goal object selected from a plurality of objects currently located in the environment;

processing the goal object image using an object representation neural network having a plurality of object representation parameters, wherein the object representation neural network is configured to process the goal object image in accordance with current values of the plurality of object representation parameters to generate a vector embedding of the goal object;

controlling the robot to perform an episode of the task by selecting actions to be performed by the robot using the object interaction task neural network while the object interaction task neural network is conditioned on the vector embedding of the goal object and in accordance with current values of the plurality of object interaction parameters;

generating, from the actions performed during the episode, a sequence of state representation—action pairs, the state representation in each state representation—action pair characterizing a state of the environment when the action in the state representation—action pair was performed by the robot during the episode;

determining whether the robot successfully performed the task for any of the plurality of objects in the environment during the episode;

when the robot successfully performed the task for any of the plurality of objects in the environment:
determining one or more reward values based on the robot successfully performing the task for one of the plurality of objects in the environment, comprising:
obtaining a successful object image of the one of the plurality of objects for which the task was successfully performed;
processing the successful object image using the object representation neural network in accordance with the current values of the object representation parameters to generate a vector embedding of the successful object;
determining a similarity measure between the vector embedding of the successful object and the vector embedding of the goal object; and
determining a first reward value based on the similarity measure between the vector embedding of the successful object and the vector embedding of the goal object; and for each reward value of the one or more reward values, training the object interaction task neural network using the sequence of state representation—action pairs and the reward value of the one or more reward values.

2. The method of claim 1, further comprising, when the robot did not successfully perform the task for any of the plurality of objects:
determining a fourth reward value that indicates that the robot failed at performing the task; and
training the object interaction task neural network using the sequence of state representation—action pairs and the fourth reward value.

3. The method of claim 1, wherein determining one or more reward values based on the robot successfully performing the task for one of the plurality of objects in the environment comprises:
setting a second reward value to a value that indicates that the task was successfully completed, and
wherein training the object interaction task neural network using the sequence of state representation— action pairs and the second reward value comprises assigning the one of the plurality of objects for which the task was successfully performed as the goal object for the training of the object interaction task neural network.

4. The method of claim 3, further comprising:
selecting an alternate object in the environment that is different from the goal object; and
training the object interaction task neural network (i) using the sequence of state representation—action pairs and a third reward value that indicates that the robot failed at performing the task and (ii) with the alternate object assigned as the goal object for the training of the object interaction task neural network.

5. The method of claim 1, wherein obtaining a successful object image of the one of the plurality of objects for which the task was successfully performed comprises:
causing the robot to place the one of the plurality of objects in a field of view of a camera; and
capturing an image of the one of the plurality of objects using the camera.

6. The method of claim 1 further comprising:
selecting an alternate object in the environment that is different from the goal object;
determining a similarity measure between the vector embedding of the successful object and a vector embedding of the alternate object;
determining a fifth reward value based on the similarity measure between the vector embedding of the successful object and the vector embedding of the alternate object; and
training the object interaction task neural network (i) using the sequence of state representation—action pairs and the fifth reward value and (ii) with the alternate object assigned as the goal object for the training of the object interaction task neural network.

7. A system comprising one or more computers and one or more storage devices storing instructions that are operable, when executed by the one or more computers, to cause the one or more computers to perform operations for training an object interaction task neural network that (i) has a plurality of object interaction parameters and (ii) is used to select actions to be performed by a robot to cause the robot to perform a task that includes performing a specified interaction with a particular object of interest in an environment conditioned on an image of the particular object of interest, the operations comprising:
obtaining a goal object image of a goal object selected from a plurality of objects currently located in the environment;
processing the goal object image using an object representation neural network having a plurality of object representation parameters, wherein the object representation neural network is configured to process the goal object image in accordance with current values of the plurality of object representation parameters to generate a vector embedding of the goal object;
controlling the robot to perform an episode of the task by selecting actions to be performed by the robot using the object interaction task neural network while the object interaction task neural network is conditioned on the vector embedding of the goal object and in accordance with current values of the plurality of object interaction parameters;
generating, from the actions performed during the episode, a sequence of state representation—action pairs, the state representation in each state representation— action pair characterizing a state of the environment when the action in the state representation—action pair was performed by the robot during the episode;
determining whether the robot successfully performed the task for any of the plurality of objects in the environment during the episode;
when the robot successfully performed the task for any of the plurality of objects in the environment:
determining one or more reward values based on the robot successfully performing the task for one of the plurality of objects in the environment, comprising:
obtaining a successful object image of the one of the plurality of objects for which the task was successfully performed;
processing the successful object image using the object representation neural network in accordance with the current values of the object representation parameters to generate a vector embedding of the successful object;
determining a similarity measure between the vector embedding of the successful object and the vector embedding of the goal object; and
determining a first reward value based on the similarity measure between the vector embedding of the successful object and the vector embedding of the goal object; and
for each reward value of the one or more reward values, training the object interaction task neural network using the sequence of state representation—action pairs and the reward value of the one or more reward values.

8. The system of claim 7, the operations further comprising, when the robot did not successfully perform the task for any of the plurality of objects:
determining a fourth reward value that indicates that the robot failed at performing the task; and
training the object interaction task neural network using the sequence of state representation—action pairs and the fourth reward value.

9. The system of claim 7, wherein determining one or more reward values based on the robot successfully performing the task for one of the plurality of objects in the environment comprises:
setting a second reward value to a value that indicates that the task was successfully completed, and
wherein training the object interaction task neural network using the sequence of state representation—action pairs and the second reward value comprises assigning the one of the plurality of objects for which the task was successfully performed as the goal object for the training of the object interaction task neural network.

10. The system of claim 7, the operations further comprising:
selecting an alternate object in the environment that is different from the goal object; and
training the object interaction task neural network (i) using the sequence of state representation—action pairs and a third reward value that indicates that the robot failed at performing the task and (ii) with the alternate object assigned as the goal object for the training of the object interaction task neural network.

11. The system of claim 7, wherein obtaining a successful object image of the one of the plurality of objects for which the task was successfully performed comprises:
causing the robot to place the one of the plurality of objects in a field of view of a camera; and
capturing an image of the one of the plurality of objects using the camera.

12. The system of claim 7 the operations further comprising:
selecting an alternate object in the environment that is different from the goal object;
determining a similarity measure between the vector embedding of the successful object and a vector embedding of the alternate object;
determining a fifth reward value based on the similarity measure between the vector embedding of the successful object and the vector embedding of the alternate object; and
training the object interaction task neural network (i) using the sequence of state representation—action pairs and the fifth reward value and (ii) with the alternate object assigned as the goal object for the training of the object interaction task neural network.

13. One or more non-transitory computer-readable storage media storing instructions that are operable, when executed by one or more computers, to cause the one or more computers to perform operations for training an object interaction task neural network that (i) has a plurality of object interaction parameters and (ii) is used to select actions to be performed by a robot to cause the robot to perform a task that includes performing a specified interaction with a particular object of interest in an environment conditioned on an image of the particular object of interest, the operations comprising:
obtaining a goal object image of a goal object selected from a plurality of objects currently located in the environment;
processing the goal object image using an object representation neural network having a plurality of object representation parameters, wherein the object representation neural network is configured to process the goal object image in accordance with current values of the plurality of object representation parameters to generate a vector embedding of the goal object;
controlling the robot to perform an episode of the task by selecting actions to be performed by the robot using the object interaction task neural network while the object interaction task neural network is conditioned on the vector embedding of the goal object and in accordance with current values of the plurality of object interaction parameters;
generating, from the actions performed during the episode, a sequence of state representation—action pairs, the state representation in each state representation—action pair characterizing a state of the environment when the action in the state representation—action pair was performed by the robot during the episode;
determining whether the robot successfully performed the task for any of the plurality of objects in the environment during the episode;
when the robot successfully performed the task for any of the plurality of objects in the environment:
determining one or more reward values based on the robot successfully performing the task for one of the plurality of objects in the environment, comprising:
obtaining a successful object image of the one of the plurality of objects for which the task was successfully performed;
processing the successful object image using the object representation neural network in accordance with the current values of the object representation parameters to generate a vector embedding of the successful object;

determining a similarity measure between the vector embedding of the successful object and the vector embedding of the goal object; and determining a first reward value based on the similarity measure between the vector embedding of the successful object and the vector embedding of the goal object; and for each reward value of the one or more reward values, training the object interaction task neural network using the sequence of state representation—action pairs and the reward value of the one or more reward values.

14. The one or more non-transitory computer-readable storage media of claim 13, the operations further comprising, when the robot did not successfully perform the task for any of the plurality of objects:

determining a fourth reward value that indicates that the robot failed at performing the task; and training the object interaction task neural network using the sequence of state representation—action pairs and the fourth reward value.

15. The one or more non-transitory computer-readable storage media of claim 13, wherein determining one or more reward values based on the robot successfully performing the task for one of the plurality of objects in the environment comprises:

setting a second reward value to a value that indicates that the task was successfully completed, and wherein training the object interaction task neural network using the sequence of state representation—action pairs and the second reward value comprises assigning the one of the plurality of objects for which the task was successfully performed as the goal object for the training of the object interaction task neural network.

16. The one or more non-transitory computer-readable storage media of claim 13, the operations further comprising:

selecting an alternate object in the environment that is different from the goal object; and training the object interaction task neural network (i) using the sequence of state representation—action pairs and a third reward value that indicates that the robot failed at performing the task and (ii) with the alternate object assigned as the goal object for the training of the object interaction task neural network.

17. The one or more non-transitory computer-readable storage media of claim 13, wherein obtaining a successful object image of the one of the plurality of objects for which the task was successfully performed comprises:

causing the robot to place the one of the plurality of objects in a field of view of a camera; and capturing an image of the one of the plurality of objects using the camera.

18. The one or more non-transitory computer-readable storage media of claim 13 the operations further comprising:

selecting an alternate object in the environment that is different from the goal object;

determining a similarity measure between the vector embedding of the successful object and a vector embedding of the alternate object;

determining a fifth reward value based on the similarity measure between the vector embedding of the successful object and the vector embedding of the alternate object; and training the object interaction task neural network (i) using the sequence of state representation—action pairs and the fifth reward value and (ii) with the alternate object assigned as the goal object for the training of the object interaction task neural network.

* * * * *